US011811533B2

(12) United States Patent
Teboulle et al.

(10) Patent No.: US 11,811,533 B2
(45) Date of Patent: Nov. 7, 2023

(54) FRAME ACKNOWLEDGEMENT METHOD

(71) Applicant: SAGEMCOM ENERGY & TELECOM SAS, Rueil Malmaison (FR)

(72) Inventors: Henri Teboulle, Rueil Malmaison (FR); Franck Harnay, Rueil Malmaison (FR)

(73) Assignee: SAGEMCOM ENERGY & TELECOM SAS, Rueil Malmaison (FR)

( * ) Notice: Subject to any disclaimer, the term of this patent is extended or adjusted under 35 U.S.C. 154(b) by 203 days.

(21) Appl. No.: 16/892,719

(22) Filed: Jun. 4, 2020

(65) Prior Publication Data

US 2020/0403734 A1 Dec. 24, 2020

(30) Foreign Application Priority Data

Jun. 18, 2019 (FR) ....................................... 1906502

(51) Int. Cl.
*H04W 4/06* (2009.01)
*H04L 1/1812* (2023.01)
*H04W 60/00* (2009.01)

(52) U.S. Cl.
CPC ............. *H04L 1/1812* (2013.01); *H04W 4/06* (2013.01); *H04W 60/00* (2013.01)

(58) Field of Classification Search
CPC ... H04L 1/1812; H04L 1/1635; H04L 1/1614; H04L 47/27; H04L 61/5069; H04L 67/02; H04L 12/1868; H04L 12/185; H04W 4/06; H04W 60/00; H04W 67/02; H04W 72/005; H04W 72/082; H04W 4/08
See application file for complete search history.

(56) References Cited

U.S. PATENT DOCUMENTS 8,411,866 B2 * 4/2013 Khalid .................. H04L 9/0833 380/255
9,160,605 B1 * 10/2015 Ducrou ................... H04L 67/10
10,554,369 B2 * 2/2020 Uhling .................. H04L 5/0055
2020/0022111 A1 * 1/2020 Teboulle ............. H04W 72/005
2022/0078040 A1 * 3/2022 Lee ......................... H04L 27/26

FOREIGN PATENT DOCUMENTS

WO 2009/158106 A2 12/2009

* cited by examiner

*Primary Examiner* — Hanh N Nguyen
(74) *Attorney, Agent, or Firm* — Williams Mullen; R. Brian Drozd

(57) ABSTRACT

In order to acknowledge uplink frames transmitted from end devices to server equipment, the server equipment allocates the end devices to groups and to subgroups. The addresses of the end devices are constructed so as to identify the groups and subgroups to which said end devices belong. The server equipment carries out mass acknowledgements by group, by broadcasting a message wherein each subgroup of said group is associated with the same item of information acknowledging, or not, said uplink frames of all the end devices of said subgroup. The mass acknowledgement further includes information representing an estimated instant of next transmission of a mass acknowledgement for said group. The server equipment acknowledges, in unicast mode, the uplink frames received that have not been acknowledged by the mass acknowledgement.

13 Claims, 6 Drawing Sheets

| JN | HN | DA | DS | RD | TINF | WUT | AK | M | K |
|---|---|---|---|---|---|---|---|---|---|
| 3 | 3 | 4 | 1 | 1 | 4 | 4 | 16 | 1 | 1 |

Fig. 4A

| NID | GID | SGID | RID |
|---|---|---|---|
| 7 | 25-M | K | M-K |

Fig. 4B

| NID | GID | SGID |
|---|---|---|
| 7 | 25-M | M [‘1’] |

Fig. 4C

| TINF | WUT | S | GID | ACK |
|---|---|---|---|---|
| 32 | 32 | (M-1) mod 8 [‘0’] | 25-M | $2^K$ |

Fig. 4D

Reception of uplink frame 701

Recording for subsequent acknowledgement 702

FRAME ACKNOWLEDGEMENT METHOD

TECHNICAL FIELD

The present invention relates to acknowledgements of uplink frames in a wireless communication system, and is particularly suited to communication systems of the LPWAN (Low-Power Wide Area Network) type, which are widespread in the Internet of Things.

PRIOR ART

The Internet of Things is emerging. The Internet of Things represents the extension of the internet to things and to places in the physical world. Whereas the internet does not normally extend beyond the electronic world, the Internet of Things represents exchanges of information and data coming from devices present in the real world to the internet, such as for example for making a collection of readings of electrical consumptions or water consumptions. The Internet of Things is considered to be the third evolution of the internet, referred to as Web 3.0. The Internet of Things is partly responsible for the current increase in the volume of data to be transmitted and stored, and thus gives rise to what is called “Big Data”. The Internet of Things has a universal character for designating putting objects for varied uses in communication, for example in the industrial, food, e-health or home-automation field.

To enable communicating objects, also referred to as end devices, to communicate in the context of the Internet of Things, gathering gateways situated on geographically high points are deployed by an operator. Apart from maintenance operations, these gathering gateways are typically fixed and permanent. Mention can be made for example, with this model, of SigFox (registered trade mark) or ThingPark (registered trade mark) networks. These gathering gateways communicate with the end devices by means of medium- or long-range radio communications of the LPWAN type, such as for example the LoRaWAN (Long Range Wide-Area Network) technology, also known by the diminutive “LoRa” (Long Range), from the name of the alliance promoting the LoRaWAN technology. These gathering gateways thus serve as relays between the end devices and a server (core network) configured to process information transferred by the end devices and for sending messages (e.g. instructions) to said end devices.

The end devices send, to a server, typically at regular intervals, uplink frames that contain the data to be gathered. So that each end device concerned knows whether the server has actually received the data that it has transmitted, the server transmits, in response, downlink frames that serve in particular to acknowledge the uplink frames in question. Each uplink frame actually received is thus acknowledged, in unicast mode, by the server. Such communication systems of the LPWAN type are typically intended to allow the gathering of data from a multitude of end devices, as is the case for example in AMM (Advanced Meter Management) automated metering management systems supervising modern electricity distribution networks. Thus, because of the large number of end devices to be managed, a large quantity of network resources (degree of occupation of the communication medium) is used for acknowledging the uplink frames.

It is then desirable to overcome these drawbacks of the prior art. It is in particular desirable to provide a solution that makes it possible to reduce the degree of occupation of the communication medium in such communication systems of the LPWAN type, more particularly with regard to the acknowledgement of the uplink frames.

DISCLOSURE OF THE INVENTION

One object of the present invention is to propose a method for acknowledging uplink frames transmitted from end devices to server equipment in a communication system, the method being implemented by the server equipment, the method comprising the following steps for each said end device: receiving from said end device a message requesting registration with the server equipment; allocating said end device to a group and, in said group, to a subgroup; obtaining an address to be used by said end device for subsequently communicating, in the communication system, part of said address identifying said group, another part of said address identifying said subgroup and yet another part of said address identifying said end device in said subgroup; and transmitting to said end device a registration-confirmation message, including the address obtained, as well as information representing an estimated instant of the next transmission of acknowledgement, referred to as mass acknowledgement, common to said group. The method further comprises the following steps, for each group: checking, for each subgroup in said group, whether an uplink frame has been received from each end device allocated to said subgroup as from the transmission of the previous mass acknowledgement for said group; constructing a mass acknowledgement wherein each subgroup of said group is associated with the same information acknowledging said uplink frames received from all the end devices in said subgroup in the case of a positive check, and with the same information not acknowledging any uplink frame received from end devices in said subgroup in the case of a negative check, the mass acknowledgement further including information representing an estimated instant of the next transmission of mass acknowledgement for said group; and broadcasting the mass acknowledgement, and acknowledging in unicast mode the uplink frames received that have not been acknowledged by the mass acknowledgement. Thus, by virtue of the mass acknowledgements and the definition of the groups and subgroups, it is possible, in a single downlink frame, to acknowledge numerous uplink frames. This approach is particularly suited to automated meter management systems AMM, wherein the end devices are meters (e.g. electricity meters) that regularly send meter readings and for which the uplink frames are generally actually received by the server equipment at the required time. In addition, constructing the addresses of the end devices from the groups and subgroups formed enables said end devices to easily deduce to which group and subgroup they belong, without having recourse to additional configuration/subscription exchanges.

According to a particular embodiment, each subgroup is associated with a bit in a field of the mass acknowledgement, said bit is set to a first predefined value for acknowledging the uplink frames of all the end devices in the associated subgroup and said bit is set to a second predefined value for acknowledging none of the uplink frames of the end devices in the associated subgroup. Thus the uplink frames are acknowledged effectively in terms of network resource consumption.

According to a particular embodiment, each registration-confirmation message further includes time reference information allowing timing synchronisation of the end device in question, and each mass acknowledgement further includes also such time reference information. Thus the end devices can easily synchronise themselves timewise in the communication system.

According to a particular embodiment, the information representing an estimated instant of next transmission of mass acknowledgement for a said group is expressed relatively with respect to said time reference. Thus fewer bits are necessary for representing said information.

According to a particular embodiment, each mass acknowledgement of each group is broadcast using a broadcasting address constructed on the basis of the addresses of the end devices in said group, replacing with a reserved value the part of said address used to identify a subgroup and the part of said address used to identify a said end device in a said subgroup. Thus the broadcasting of the mass acknowledgements is easy.

According to a particular embodiment, each registration-confirmation message further includes a parameter value K defining, in the address of the end device to which the registration-confirmation message is addressed, the width of representation in number of bits of the subgroups of the group to which said end device is allocated. Thus the number of subgroups can easily be adjusted.

According to a particular embodiment, each registration-confirmation message further includes a parameter value M so that the difference M−K defines, in the address of the end device to which the registration-confirmation message is addressed, the width of representation in number of bits of the identifiers of the end devices of the subgroup concerned. Thus the number of end devices per subgroup can easily be adjusted.

According to a particular embodiment, each group identifier implicitly supplies a parameter value M so that the difference M−K defines, in the address of the end device to which the registration-confirmation message is addressed, the width of representation in number of bits of the identifiers of the end devices in the subgroup concerned, the value of the parameter M then being obtained as follows: consecutively running through the most significant bits in order to detect at which index the first bit in sequence to have such and such a value starting from the most significant bit is situated; and using a predefined conversion table or formula known to said end device and to the server equipment between this index and the value of the parameter M. Thus the number of end devices per subgroup can easily be adjusted, and this implicitly.

The invention also relates to a method for managing acknowledgement of uplink frames transmitted from end devices to server equipment in a communication system, the method being implemented by each end device, the method comprising the following steps: transmitting to the server equipment a message requesting registration with the server equipment; receiving from the server equipment a registration-confirmation message including an address to be used by said end device in order subsequently to communicate in the communication system, part of said address identifying a group to which said end device is allocated, another part of said address identifying a subgroup to which said end device is allocated in said group and yet another part of said address identifying said end device in said subgroup, the registration-confirmation message further including information representing an estimated instant of next transmission of acknowledgement, referred to as mass acknowledgement, common to said group; transmitting an uplink frame to the server equipment; receiving, by broadcast, a mass acknowledgement in which each subgroup in said group is associated with the same information acknowledging or not said uplink frames received from all the end devices in said subgroup, the mass acknowledgement further including information representing an estimated instant of next transmission of mass acknowledgement for said group; and receiving an acknowledgement in unicast mode when the uplink frame has not been acknowledged by the mass acknowledgement.

The invention also relates to a computer program, which can be stored on a medium and/or downloaded from a communication network, in order to be read by a processor. This computer program comprises instructions for implementing one or other of the methods mentioned above, when said program is executed by the processor. The invention also relates to an information storage medium storing such a computer program.

The invention also relates to server equipment configured to acknowledge uplink frames transmitted from end devices to the server equipment in a communication system, the server equipment implementing, for each said end device: means for receiving from said end device a message requesting registration with the server equipment; means for allocating said end device to a group, and, in said group, to a subgroup; means for obtaining an address to be used by said end device for subsequently communicating in the communication system, part of said address identifying said group, another part of said address identifying said subgroup and yet another part of said address identifying said end device in said subgroup; means for transmitting to said end device a registration-confirmation message, including the address obtained, as well as information representing an estimated instant of next transmission of acknowledgement, referred to as mass acknowledgement, common to said group. In addition, the server equipment implements, for each group: means for checking, for each subgroup in said group, whether an uplink frame has been received from each end device allocated to said subgroup as from the transmission of the previous mass acknowledgement for said group; means for constructing a mass acknowledgement wherein each subgroup in said group is associated with the same information acknowledging said uplink frames received from all the end devices in said subgroup in the case of a positive check, and with the same information not acknowledging any uplink frame received from end devices in said subgroup in the case of a negative check, the mass acknowledgement further including information representing an estimated instant of next transmission of mass acknowledgement for said group; and means for broadcasting the mass acknowledgement, and acknowledging in unicast mode the uplink frames received that have not been acknowledged by the mass acknowledgement.

The invention also relates to an end device configured to manage acknowledgement of uplink frames transmitted to server equipment in a communication system comprising other end devices, said end device implementing: means for transmitting to the server equipment a request for registration with the server equipment; means for receiving from the server equipment a registration-confirmation message including an address to be used by said end device for subsequently communicating in the communication system, part of said address identifying a group to which said end device is allocated, another part of said address identifying a subgroup to which said end device is allocated in said group and yet another part of said address identifying said end device in said subgroup, the registration-confirmation message further including information representing an estimated instant of next transmission of acknowledgement, referred to as mass acknowledgement, common to said group; means for transmitting an uplink frame to the server equipment; means for receiving, by broadcast, a mass acknowledgement wherein each subgroup in said group is associated with the same information acknowledging or not said uplink frames received from all the end devices in said subgroup, the mass acknowledgement further including information representing an estimated instant of next transmission of mass acknowledgement for said group; and means for receiving an acknowledgement in unicast mode when the uplink frame has not been acknowledged by the mass acknowledgement.

BRIEF DESCRIPTION OF THE DRAWINGS

The features of the invention mentioned above, as well as others, will emerge more clearly from a reading of the following description of at least one example embodiment, said description being given in relation to the accompanying drawings, among which:

FIG. 4A illustrates schematically message fields exchanged in the communication system of FIG. 1, in a particular embodiment of the invention;

FIG. 4B illustrates schematically other message fields exchanged in the communication system of FIG. 1, in a particular embodiment of the invention;

FIG. 4C illustrates schematically yet other message fields exchanged in the communication system of FIG. 1, in a particular embodiment of the invention;

FIG. 4D illustrates schematically yet other message fields exchanged in the communication system of FIG. 1, in a particular embodiment of the invention;

DETAILED DISCLOSURE OF EMBODIMENTS

Figure 1:
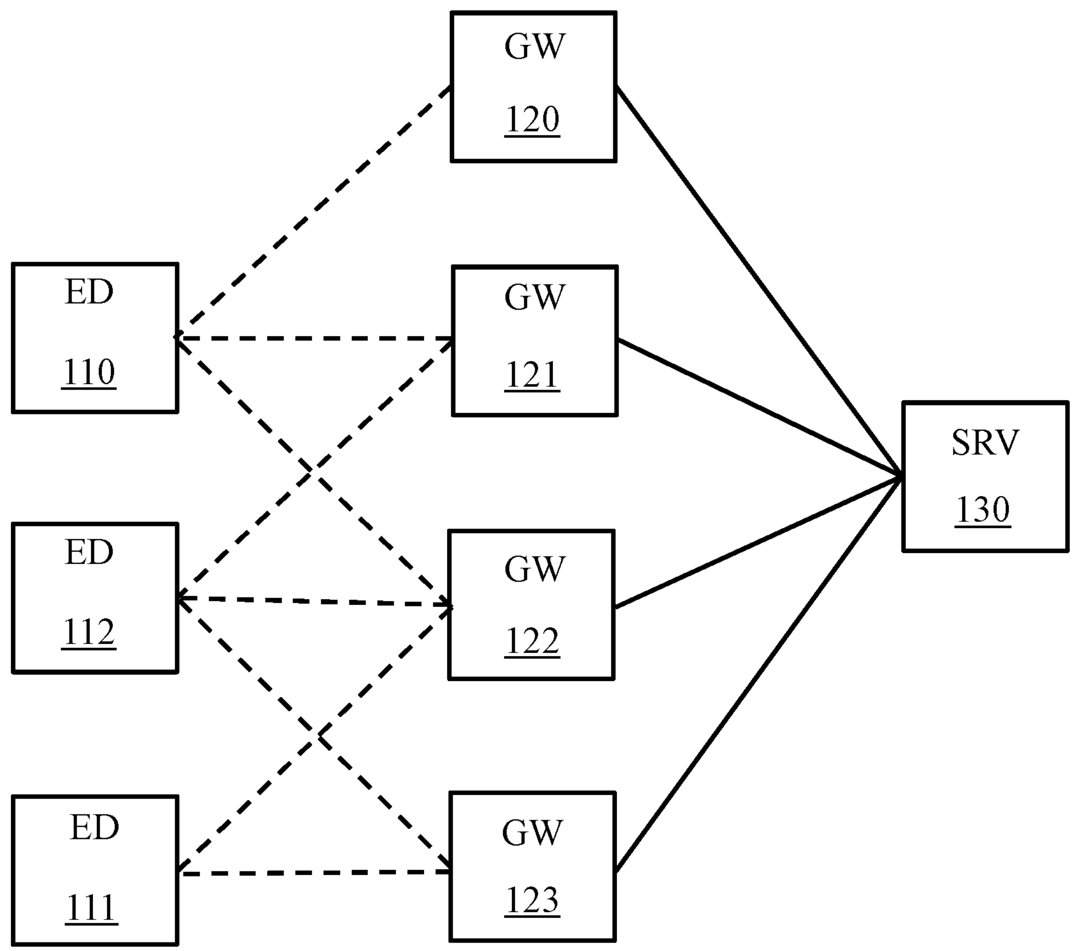
FIG. 1 illustrates schematically a communication system wherein the present invention can be implemented.

FIG. 1 illustrates schematically a communication system wherein the present invention can be implemented. The communication system comprises at least one gathering gateway (denoted GW, standing for "GateWay", in the Figs.). Four gathering gateways GW 120, 121, 122, 123 are depicted for purely illustrative purposes in FIG. 1. The gathering gateways GW 120, 121, 122, 123 have respective communication links with server equipment 130 (denoted SRV in the Figs.) to which said gathering gateways GW 120, 121, 122, 123 are attached.

In the communication system, messages must be transferred in the form of frames, referred to as uplink frames, from a set of end devices (denoted ED, standing for "End Device", in the Figs.) to the server equipment SRV 130 by means of the gathering gateways GW 120, 121, 122, 123. Three end devices ED 110, 111, 112 are depicted for purely illustrative purposes in FIG. 1, but the communication system typically comprises a large quantity of end devices ED (several hundreds or even several thousands of end devices ED).

The server equipment SRV 130 has a role of controlling the end devices ED 110, 111, 112 and gathering information available from the end devices ED 110, 111, 112. The gathering gateways GW 120, 121, 122, 123 have a role of relay between the end devices ED 110, 111, 112 and the server equipment SRV 130.

Messages, in particular acknowledgement messages, must also be transmitted in the form of frames, referred to as downlink frames, from the server equipment SRV 130 to the end devices ED 110, 111, 112 by means of the gathering gateways GW 120, 121, 122, 123.

The server equipment SRV 130 may consist of a plurality of interconnected servers. For example, the server equipment SRV 130 consists of a network management server of the LNS (LoRaWAN Network Server) type and at least one application server responsible for processing the data gathered from the end devices ED 110, 111, 112.

To make it possible to fulfil their role of relay, each gathering gateway GW 120, 121, 122, 123 has at least one radio interface enabling said gathering gateway GW to communicate with at least one said end device ED 110, 111, 112 by relying on a wireless communication network, and preferably in accordance with a communication technology of the LPWAN type. Said radio interface is for example of the LoRa type thus making it possible to implement, in the communication system, a data transmission protocol of the LoRaWAN type. Said radio interface is such that an end device ED may be within radio communication range of a plurality of gathering gateways GW, depending on the geographical position of said end device ED with respect to the gathering gateways GW 120, 120, 121, 122, 123 of the communication system and the radio transmission conditions in the environment of said end device ED and of the gathering gateways GW 120, 121, 122, 123. This is the case for example with the end device ED 110 in FIG. 1, which is within radio communication range of the gathering gateways GW 120, 121 and 122 (represented by broken lines in FIG. 1). In addition, each gathering gateway GW 120, 121, 122, 123 has at least one other interface enabling said gathering gateway to communicate with the server equipment SRV 130. For example, this other interface is a cable interface making it possible to communicate with the server equipment SRV 130 via the internet.

An example of protocol architecture implemented in the communication system in order thus to enable the end devices ED 110, 111, 112 and the server equipment SRV 130 to communicate by means of gathering gateways GW 120, 121, 122, 123 is described below in relation to FIG. 3.

FIG. 1 illustrates schematically an example of hardware architecture of a communication device of the communication system in FIG. 1. "Communication device" means a said end device ED 110, 111, 112, or a said gathering gateway GW 120, 121, 122, 123, or a server of the server equipment SRV 130. Thus each end device ED 110, 111, 112 and/or each gathering gateway GW 120, 121, 122, 123 and/or each server of the server equipment SRV 130 can be constructed on the basis of such hardware architecture.

The communication device in question comprises, connected by a communication bus 210: a processor or CPU (central processing unit) 201; a random access memory RAM 202; a read only memory ROM 203; a storage unit or a storage medium reader, such as an SD (Secure Digital) card reader 204 or a hard disk HDD (hard disk drive); a communication interface IF1 205, and optionally another communication interface IF2 206.

Figure 2:
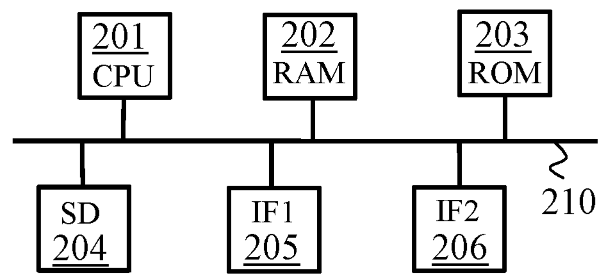
FIG. 2 illustrates schematically an example of hardware architecture of a communication device of the communication system of FIG. 1.

When the communication device in FIG. 2 represents a said end device ED 110, 111, 112, the communication interface IF1 205 is configured to enable said end device ED 110, 111, 112 to communicate with one or more said gathering gateways GW 120, 121, 122, 123.

When the communication device in FIG. 2 represents a said gathering gateway GW 120, 121, 122, 123, the communication interface IF1 205 is configured to enable said gathering gateway GW 120, 121, 122, 123 to communicate with one or more said end devices ED, and the other communication interface IF2 206 is configured to enable said gathering gateway GW 120, 121, 122, 123 to communicate with the server equipment SRV 130.

When the communication device in FIG. 2 represents a server of the server equipment SRV 130, the communication interface IF1 205 is configured to enable said server to communicate with the gathering gateways GW 120, 121, 122, 123.

The processor 201 is capable of executing instructions loaded in the RAM memory 202 from the ROM memory 203, from an external memory, from a storage medium, or from a communication network. When the communication device in question is powered up, the processor 201 is capable of reading instructions from the RAM memory 202 and executing them. These instructions form a computer program causing the implementation, by the processor 201, of all or some of the algorithms and steps described here in relation to the communication device in question.

Thus all or some of the algorithms and steps described here can be implemented in software form by the execution of a set of instructions by a programmable machine, such as a DSP (digital signal processor) or a microcontroller. All or some of the algorithms and steps described here can also be implemented in hardware form by a dedicated machine or a dedicated set of components (chipset) or a dedicated component (chip), such as an FPGA (field-programmable gate array) or an ASIC (application-specific integrated circuit). In general terms, the communication device in question comprises electronic circuitry suitable and configured for implementing the algorithms and steps that are described here in relation to said communication device.

Figure 3:
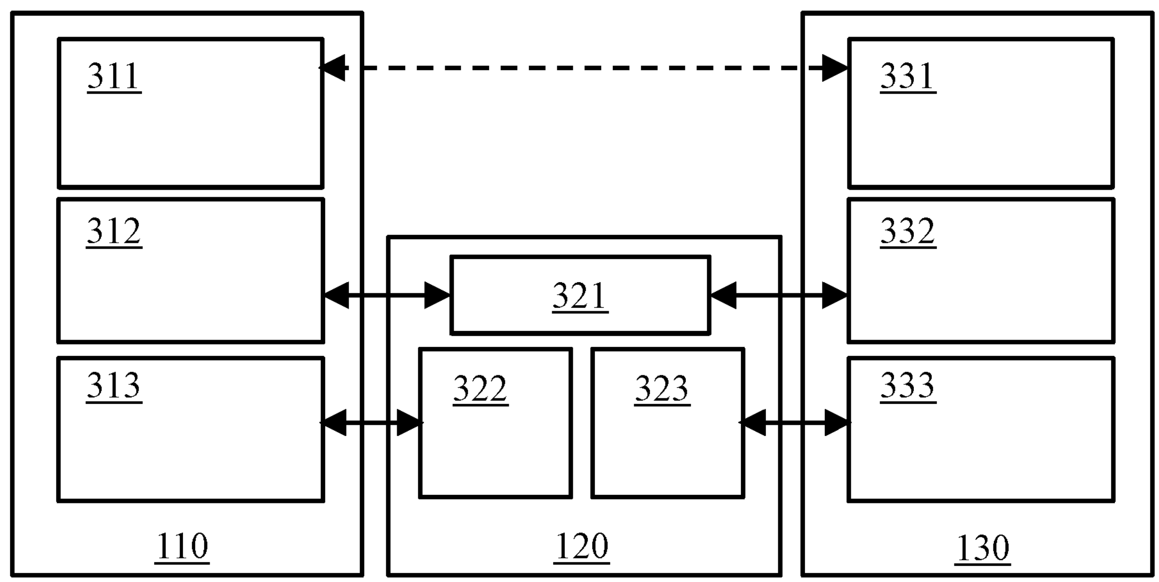
FIG. 3 illustrates schematically an example of protocol architecture implemented in the communication system of FIG. 1.

FIG. 3 illustrates schematically an example of protocol architecture implemented in the communication system in FIG. 1. FIG. 3 depicts, by way of illustration, the protocol architecture distributed between the end device ED 110, the gathering gateway GW 120 and the server equipment SRV 130.

The end device ED 110 comprises a top layer 311 and a bottom layer 313, as well as an intermediate layer 312 forming the link between the top layer 311 and the bottom layer 313. The top layer 311 is a client application. The end device ED 110 can thus comprise a plurality of client applications. The intermediate layer 312 implements the exchange protocol, for example of the LoRaWAN type, between the end device ED 110 and the server equipment SRV 130 via the gathering gateway GW 120. The bottom layer 313 is the physical layer (PHY) of the radio interface of the end device ED 110, for example of the LoRa type, which enables the end device ED 110 to communicate with the gathering gateway GW 120.

The server equipment SRV 130 comprises a top layer 331 and a bottom layer 333, as well as an intermediate layer 332 forming the link between the top layer 331 and the bottom layer 333. The top layer 331 is a server application. The server equipment SRV 130 can thus comprise a plurality of server applications. It should be noted that the representation in FIG. 3 is a logic representation, and that the server applications may be executed on distinct respective items of equipment, or that the server equipment SRV 130 may be seen as a set consisting of a plurality of interconnected machines that collaboratively implement the functionalities described here.

The intermediate layer 332 implements the exchange protocol, for example of the HTTPS (HyperText Transfer Protocol Secure) type, between the server equipment SRV 130 and the gathering gateway GW 120. The bottom layer 333 is the physical layer (PHY) of the interface of the server equipment SRV 130 that makes it possible to communicate with the gathering gateway GW 120.

The gathering gateway GW 120 comprises a first bottom layer 322 and a second bottom layer 323, as well as an adaptation module 321. The first bottom layer 322 is the physical layer (PHY) of the radio interface of the gathering gateway GW 120 that makes it possible to communicate with the end device ED 110. The second bottom layer 323 is the physical layer (PHY) of the interface of the gathering gateway GW 120 that makes it possible to communicate with the server equipment SRV 130. The adaptation module 321 is configured to convert the messages received via the first bottom layer 322 into messages adapted to the second bottom layer 323 (uplink frames) and vice versa (downlink frames). During this conversion, the gathering gateway GW 120 can enhance said message with supplementary information, such as for example a received signal strength indicator RSSI determined by the gathering gateway GW 120 on reception of said message coming from a said end device ED.

The protocol architecture depicted in FIG. 3 is such that the intermediate layer 312 of the end device ED 110 communicates with the intermediate layer 321 of the gathering gateway GW 120, relying on the respective bottom layers of the end device ED 110 and of the gathering gateway GW 120. The protocol architecture depicted in FIG. 3 is also such that the top layer 311 of the end device ED 110 communicates with the top layer 331 of the server equipment SRV 130, relying on the respective intermediate layers 312, 321, 332 of the end device ED 110, of the gathering gateway GW 120 and of the server equipment SRV 130. One and the same server application can thus communicate with respective client applications executed on the same number of said end devices ED, and one and the same end device ED executing a plurality of client applications can thus communicate with the same number of server applications executed on the server equipment SRV 130.

The protocol layers or modules depicted may be supplemented, in particular by protocol cells enabling the server equipment SRV 130 to exchange with the gathering gateway GW 120, in particular to enable the server equipment SRV 130 to configure, as required, the gathering gateway GW 120.

In order to enable each said end device ED to know whether data that said end device ED 110 previously transmitted to the server equipment SRV 130 have actually been received, the server equipment SRV 130 acknowledges the uplink frames received from said end devices ED. To make it possible to conserve network resources, the server equipment SRV 130 performs groupings by groups and subgroups of end devices ED and, by broadcasting, carries out mass acknowledgements common for each group. In a mass acknowledgement for a group, each subgroup in said group is associated with the same information acknowledging or not the uplink frames received from all the end devices in said subgroup. A large number of uplink frames can thus be acknowledged by means of a single downlink frame. When one or more uplink frames are missing in a subgroup, the server equipment SRV 100 makes acknowledgements in unicast mode for the uplink frames of this subgroup. This aspect is detailed below.

FIGS. 4A to 4D illustrate schematically message fields exchanged in the communication system of FIG. 1, in a particular embodiment of the invention.

FIG. 4A depicts more particularly fields used in a JOIN-ACCEPT message by means of which the server equipment SRV 130 indicates to an end device ED that said end device ED has been registered in the communication system. The fields in FIG. 4A are more particularly:

- JN, JoinNonce, of 3 bytes, as defined in the LoRaWAN specification;
- HN, Home_NetID, of 3 bytes, as defined in the LoRaWAN specifications;
- DA, DevAddr, of 4 bytes, as detailed in FIG. 4B;
- DS, DLSettings, of 1 byte, as defined in the LoRaWAN specifications;
- RD, RxDelay, of 1 byte, as defined in the LoRaWAN specifications;
- TINF, TimeInfo, of 4 bytes, which optionally provides a time reference allowing time-setting synchronisation of the end device ED in question, and which is for example expressed in seconds since 1 Jan. 1970 at midnight;
- WUT, WakeUpTime, of 4 bytes, which indicates an estimated instant of next transmission of mass acknowledgement, and which is for example expressed in seconds since 1 Jan. 1970 at midnight;
- AK, AppKey_B, of 16 bytes, which optionally provides an encryption key for the broadcast frames;
- M, which optionally provides a first parameter for interpretation of the field DA, DevAddr, as detailed in FIG. 4B; and
- K, which optionally provides a second parameter for interpretation of the field DA, DevAddr, as detailed in FIG. 4B.

It should be noted that the field WUT can be expressed relatively with respect to the field TINF, for example in number of seconds as from a time reference provided by the field TINF. The size of the field WUT may then be shortened, for example to 3 bytes.

FIG. 4B depicts more particularly fields (or subfields) used for forming the field DA, DevAddr, mentioned above in relation to FIG. 4A. The fields in FIG. 4B are more particularly:

- NID, NwkID, of 7 bits, as defined in the LoRaWAN specifications;
- GID, GroupID, of 25-M bits (that is to say 15 bits when M is equal to 10), which provides a group identifier to which the server equipment SRV 130 has attached the end device ED in question;
- SGID, SubGroupID, of K bits, which provides an identifier of a subgroup to which the server equipment SRV 100 has attached the end device ED in question in the group identified by the field GID;
- RID, RankID, of M−K bits (that is to say 2 bits when M is equal to 10 and K to 8), which provides an identifier of an end device ED in the subgroup identified by SGID.

It should therefore be noted, in the light of the above, that K<M.

The parameter K (cf. field of the same name in FIG. 4A) defines the width of representation in number of bits of the subgroups in the group to which the end device ED concerned is allocated. The parameter M (cf. field of the same name in FIG. 4A) is fixed so that the difference M−K defines the width of representation in number of bits of the identifiers of end devices ED in the subgroup to which the end device ED concerned is allocated. In FIG. 4B, the parameter M defines directly the maximum quantity of end devices ED per group, and also indirectly the maximum quantity of groups in the communication system.

As detailed hereinafter, the present invention enables the server equipment SRV 130 to acknowledge, in a single message, the uplink frames sent to one and the same server application by all said end devices ED in the same subgroup during a period P of predefined duration, knowing that each client application of each said end device ED can transmit only one frame to the corresponding server application in the server equipment SRV 130 during said period P of predefined duration. The duration of the period P therefore defines a (mass) acknowledgement rate and is adjusted so that the transfers of data from the client applications to their corresponding server applications comply with this rule of a single uplink frame per period P between two mass acknowledgements. The duration of the period P can therefore differ from one server application to another.

In a particular embodiment, M is deduced from the identifier of the group (field GID in FIG. 4B). The end device ED concerned recovers the value of the field DA, DevAddr, and puts on one side the part concerning the field NID (cf. FIG. 4B). The most significant bits of the remaining part are consecutively run through in order to detect at which index the first bit in sequence to have such and such a value (first bit at 1 in sequence or first bit at 0 in sequence) is situated, starting from the most significant bit. A predefined conversion table, or formula, known to the end device ED and to the server equipment SRV 130 makes it possible to make the conversion between this index and the value of the parameter M. For example, if the first bit at 1 in sequence is the most significant bit, M is equal to 8; if it is the following bit that is the first bit at 1 in sequence, M is equal to 9; if it is the following bit that is the first bit at 1 in sequence, M is equal to 10; etc.). This excludes the use of certain values of the field GID (and therefore of the maximum number of groups actually usable in the communication system), but this makes it possible to dynamically define the value of the parameter M without having to mention it explicitly in the message JOIN-ACCEPT.

FIG. 4C shows more particularly a constitution of a broadcast address compatible with the field DA, DevAddr, mentioned above in relation to FIG. 4A. All the M bits of the fields SGID and RID of FIG. 4B are set to a reserved value (e.g. all the bits at 1), not used as a unicast communication address and known to every end device ED able to join the communication system. The broadcast address thus defined is then used to broadcast downlink frames for the attention of all the end devices ED belonging to the group identified by the field GID in the communication system identified by the field NID.

FIG. 4D shows more particularly fields used in a mass acknowledgement message MACK by means of which the server equipment SRV 130 acknowledges the uplink frames by subgroup of a group of said end devices ED. The fields in FIG. 4D are more particularly:

- TINF, TimeInfo, of 32 bits (i.e. 4 bytes), which optionally provides a time reference allowing time-setting synchronisation of the end devices ED, and which is for example expressed in seconds since 1 Jan. 1970 at midnight;
- WUT, WakeUpTime, of 32 bits (i.e. 4 bytes), which indicates an estimated instant of next transmission of mass acknowledgement, which is expressed in seconds since 1 Jan. 1970 at midnight;
- S, Stuffing, of (M−1) modulo 8 bits of default value (e.g. of zero value), which makes it possible to make an alignment on an integer number of bytes;
- GID, GroupID, of 25-M bits, which makes it possible to identify the group to which the mass acknowledgement message MACK is sent by the server equipment SRV 130;
- ACK, of $2^K$ bits, each bit of index $k \in [0; 2^K-1]$ of which makes it possible to identify each subgroup, in the group identified by the field GID, for which an acknowledgement of uplink frames is provided by the server equipment SRV 130.

Thus, when the $k^{th}$ bit of the field ACK is positioned at a first predefined value (e.g. at the value 1), the server equipment SRV 130 acknowledges the uplink frame sent to the same server application by all said end devices ED of the subgroup identified by the index $k \in [0; 2^K-1]$ during a period P of predefined duration. When the server equipment SRV 130 implements a plurality of server applications, the server application concerned is identified by means of a field FPORT, as defined in the LoRaWAN specifications, of a header (not shown in FIG. 4D) of the mass acknowledgement message MACK.

It should be noted that here also the field WUT can be expressed relatively with respect to the field TINF, for example in a number of seconds as from the time reference supplied by the field TINF.

Figure 5A:
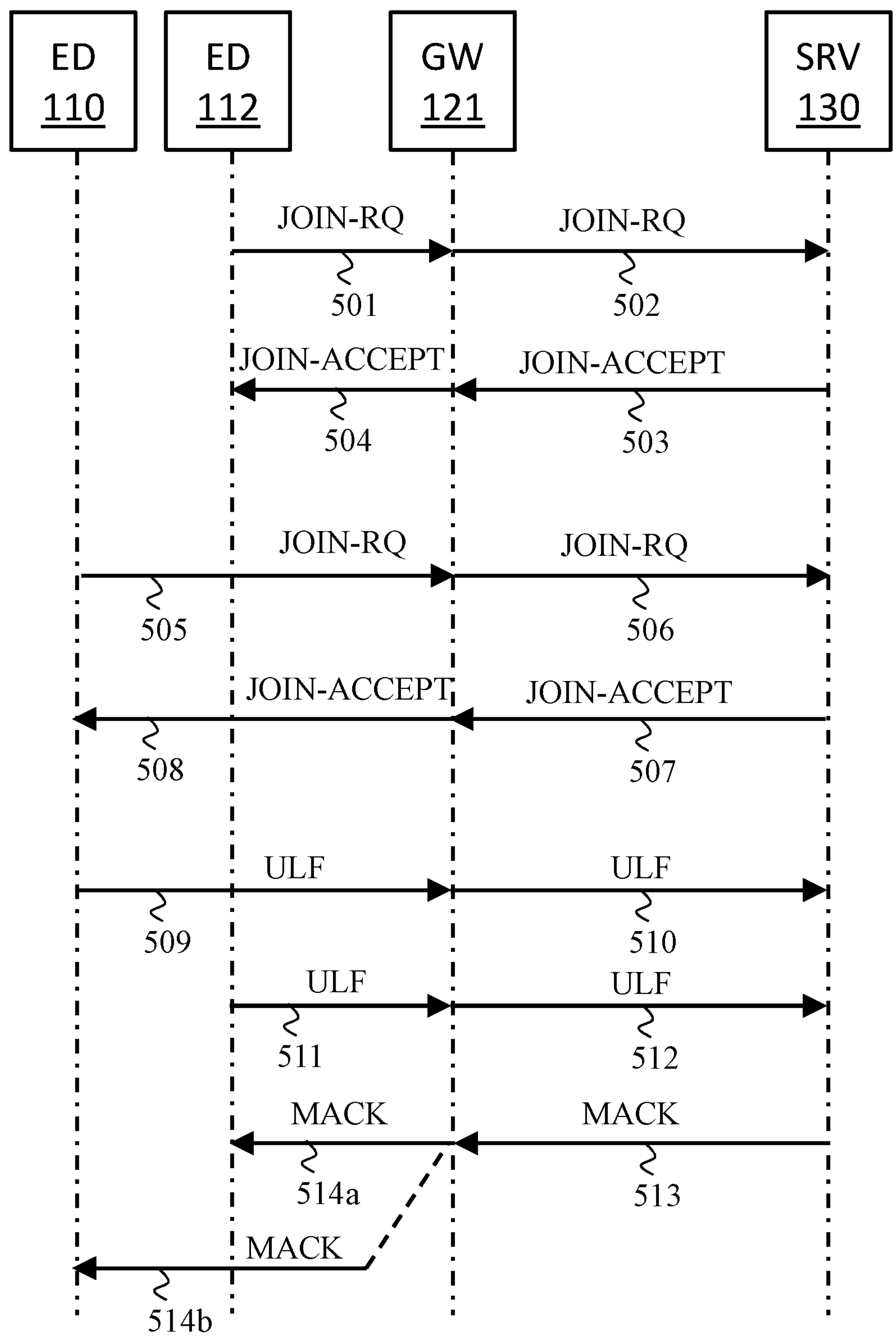
FIG. 5A illustrates schematically message exchanges in the communication system of FIG. 1, in a particular embodiment of the invention.

FIG. 5A illustrates schematically message exchanges in the communication system of FIG. 1, in a particular embodiment of the invention. For purely illustrative purposes, FIG. 5A shows these exchanges between the server equipment SRV 130 on the one hand and the end devices ED 110 and 112 on the other hand, by means of the gathering gateway GW 121.

In a step 501, the end device ED 112 sends a message JOIN-RQ requesting registration with the server equipment SRV 130. This message JOIN-RQ includes a unique identifier, DevEUI, of the end device ED 112. This message JOIN-RQ preferentially corresponds to the message "join-request" in the LoRaWAN specifications. This message JOIN-RQ is captured at least by the gathering gateway GW 121, which relays it to the server equipment SRV 130 in a step 502.

In a step 503, the server equipment SRV 130 sends, in response to the message JOIN-RQ of the end device ED 112, a registration-confirmation message JOIN-ACCEPT which includes the information contained in the fields defined in FIG. 4A. Thus, by means of this message JOIN-ACCEPT, the server equipment SRV 130 indicates to the end device ED 112 to which group (field GID) the end device ED 112 belongs, and to which subgroup (field SGID) the end device ED 112 belongs within said group. In addition, by means of this message JOIN-ACCEPT, the server equipment SRV 130 indicates to the end device ED 112 at which instant the next transmission of a mass acknowledgement message MACK for said group is planned. Other information can optionally be included in the message JOIN-ACCEPT, as detailed below in relation to FIG. 6, and in particular a time reference for synchronising timewise. This message JOIN-ACCEPT preferentially corresponds to the message "join-accept" in the LoRaWAN specifications, with the exception of the additional fields defined in FIG. 4A. This message JOIN-ACCEPT is transmitted to the gathering gateway GW 121, selected by the server equipment SRV 130 for relaying said message JOIN-ACCEPT. The gathering gateway GW 121 then, in a step 504, relays said message JOIN-ACCEPT to the end device ED 112.

In a step 505, the end device ED 110 sends a message JOIN-RQ requesting registration with the server equipment SRV 130. This message JOIN-RQ is treated in the same way as the message JOIN-RQ previously transmitted by the end device ED 112 and is relayed to the server equipment SRV 130 by the gathering gateway GW 121 in a step 506.

In a step 507, the server equipment SRV 130 sends, in response to the message JOIN-RQ of the end device ED 110, a registration-confirmation message JOIN-ACCEPT which includes the information contained in the fields defined at FIG. 4A. This message JOIN-ACCEPT is treated in the same way as the message JOIN-ACCEPT previously transmitted to the end device ED 112, and is relayed to the end device ED 110 by the gathering gateway GW 121 in a step 508.

By way of illustration, it is considered here that the end devices ED 110 and 112 belong to the same group and, within said group, to the same subgroup. In addition, it is considered here that the server equipment SRV 130 has sent the same field value WUT to the end devices ED 110 and 112.

In a step 509, the end device ED 110 transmits a first uplink frame ULF (standing for "UpLink Frame") to the server equipment SRV 130. This first uplink frame ULF is captured at least by the gathering gateway GW 121, which relays said first uplink frame ULF to the server equipment SRV 130 in a step 510. This first uplink frame ULF contains data intended to be collected by the server application concerned. When the server application concerned is not obvious (typically when the communication system is not dedicated to a single server application), the server application concerned is identified by means of the field FPORT, as defined in the LoRaWAN specifications, of a header of said first uplink frame ULF.

In a step 511, the end device ED 112 transmits a second uplink frame ULF to the server equipment SRV 130. This second uplink frame ULF is captured at least by the gathering gateway GW 121, which relays said second uplink frame ULF to the server equipment SRV 130 in a step 512. This second uplink frame ULF contains data intended to be collected by the server application concerned. When the server application concerned is not obvious (typically when the communication system is not dedicated to a single server application), the server application concerned is identified by means of the field FPORT, as defined in the LoRaWAN specifications, of a header of said second uplink frame ULF.

When the instant of the next transmission of a mass acknowledgement message MACK for the group to which the end devices ED 110 and 112 belong is reached (minus obviously a margin MG compensating for the network latency between the server equipment SRV 130 and the gathering gateways GW 120, 121, 122, 123), the server equipment SRV 130 determines whether the server equipment SRV 130 has received, during the period P that has just elapsed, an uplink frame from each of the end devices ED belonging to the same subgroup as the end devices ED 110 and 112. Each client application is in fact supposed, in nominal mode, to transmit one uplink frame per period P to its corresponding server application and, in any event, no more than one uplink frame for any one server application per period P. If such is the case, the server equipment SRV 130 acknowledges all the uplink frames sent in the period P that has just elapsed by the end devices ED belonging to the same subgroup as the end devices ED 110 and 112 (and therefore including those transmitted by the end devices ED 110 and 112).

The server equipment SRV 130 then prepares a mass acknowledgement message MACK, in the form of a downlink frame to be broadcast for the group in question. The bit corresponding to the value of index $k \in [0; 2^K-1]$ representing the subgroup of the end devices ED 110 and 112 in the field ACK is set to the aforementioned predefined first value. The server equipment SRV 130 does the same for the other subgroups of the group in question. The server equipment SRV 130 starts a new period P, estimates at which instant the next mass acknowledgement transmission for said group will take place, and completes the downlink frame accordingly.

In a step 513, the server equipment SRV 130 transmits, to the gathering gateway GW 121, the mass acknowledgement message MACK, in the form of a downlink frame that the gathering gateway GW 121 broadcasts to the group concerned. This mass acknowledgement message MACK thus uses the broadcasting address defined for the group in question. The server equipment SRV 130 indicates to the gathering gateway GW 121 at which moment the mass acknowledgement message MACK is supposed to be transmitted. This moment corresponds to the instant represented in the field WUT (cf. FIG. 4D).

Since the server equipment SRV 130 indicated, in the JOIN-ACCEPT messages sent respectively to the end devices ED 110 and 112, at which instant the next transmission of a mass acknowledgement MACK (cf. field WUT in FIG. 4A) was supposed to occur, the end devices ED 110 and 112 are able to listen on the communication medium at the opportune moment. A certain margin, concerning the listening time range of the medium, can be taken by the end devices ED 110 and 112 in order to compensate for any potential clock drift.

The mass acknowledgement message MACK is thus received by the end device ED 112 in a step 514*a* and by the end device ED 110 in a step 514*b*. The end devices ED 110 and 112 can thus determine whether their uplink frames are acknowledged, by looking at the value of the bit corresponding to the value of index $k \in [0; 2^K-1]$ representing the subgroup of the end devices ED 110 and 112 in the field ACK of said mass acknowledgement message MACK. The end devices ED 110 and 112 can synchronise themselves timewise, vis-à-vis the network, by means of the field TINF, and can thus determine at which instant the transmission of the next mass acknowledgement message MACK is supposed to take place by means of the field WUT (cf. FIG. 4D). Moreover, the end devices ED can listen on the medium in order to resynchronise themselves and to obtain the instant of reception of the next mass acknowledgement message MACK, even in a situation where no acknowledgement is expected by said end devices ED.

Figure 5B:
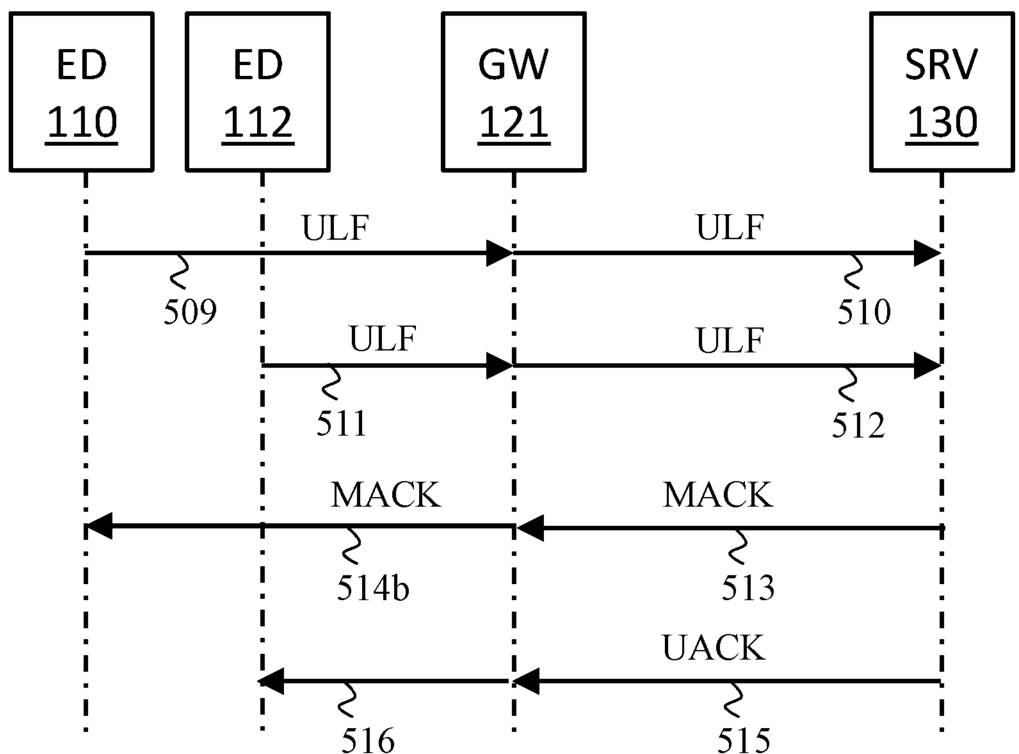
FIG. 5B illustrates schematically other message exchanges in the communication system of FIG. 1, in a particular embodiment of the invention.

FIG. 5B illustrates schematically a variant of the message exchanges in FIG. 5A, wherein it is considered that the end devices ED 110 and 112 belong to the same group but, within said group, to distinct subgroups. In FIG. 5B there are the transmissions of the uplink frames of the steps 509 to 512. It is considered here that the server equipment SRV 130 has actually received an uplink frame from each end device ED in the same subgroup as the end device ED 110, but has not received any uplink frame from at least one other said end device ED in the same subgroup as the end device ED 112. In this case, the acknowledgement of the uplink frames sent by the subgroup to which the end device ED 112 belongs cannot take place by means of the mass acknowledgement MACK.

The mass acknowledgement MACK does however serve for the end device EC 112 to identify the fact that its uplink frame should be acknowledged in unicast mode, if said uplink frame has actually been received by the server equipment SRV 130. In addition, the mass acknowledgement MACK serves for the end device ED 112 to determine at which instant the transmission of the next mass acknowledgement message MACK is supposed to take place by means of the field WUT and, as required, to synchronise itself timewise by means of the field TINF.

The server equipment SRV 130 acknowledges the uplink frames received from the end devices ED in the subgroup to which the end device ED 112 belongs, using individual acknowledgement messages UACK transmitted in unicast mode. Thus the server equipment SRV 130 sends to the gathering gateway GW 121, in a step 515, the individual acknowledgement message UACK intended for the end device ED 112. The gathering gateway GW 121, in a step 516, relays the individual acknowledgement message UACK sent to the end device ED 112.

In the case where the end device ED 112 does not receive an individual acknowledgement message UACK before the expiry of a predefined period P UACK after the reception of the mass acknowledgement message MACK, the end device ED 112 considers that its uplink frame has not been received by the server equipment SRV 130 and the end device ED 112 then subsequently retransmits the data that were contained in the uplink frame that was lost.

In a particular embodiment (not illustrated in FIGS. 5A and 5B), the server equipment SRV 130 performs a plurality of successive transmissions of the mass acknowledgement message MACK, with a lapse of time of predefined duration between them (typically 4 seconds). This makes it possible to counteract any clock shifts that might have occurred in the end devices ED concerned and/or to counteract any interferences that would affect the reception of said mass acknowledgement message MACK.

Figure 6:
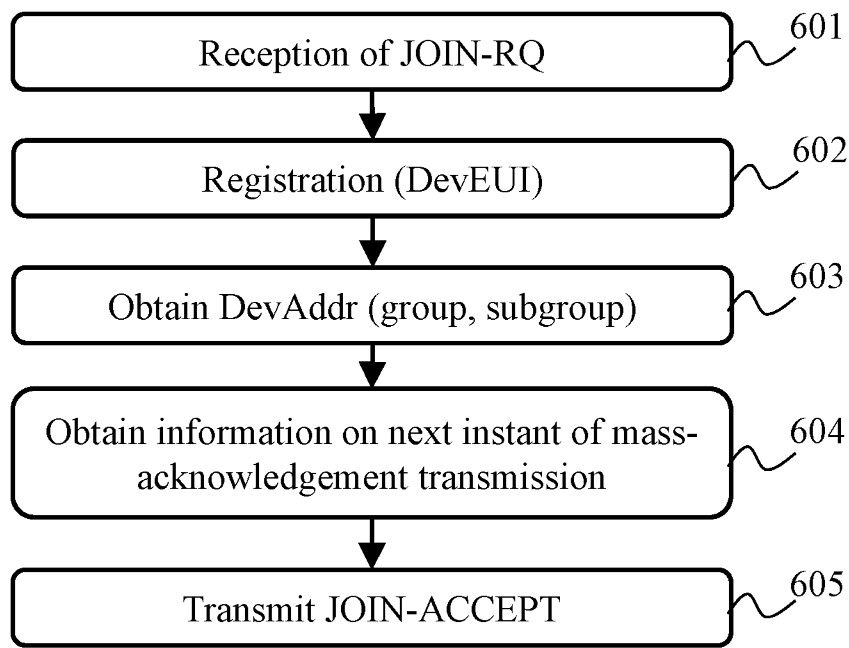
FIG. 6 illustrates schematically an algorithm for registering an end device in the communication system of FIG. 1, in a particular embodiment of the invention.

FIG. 6 illustrates schematically an algorithm for registering an end device ED in the communication system in FIG. 1, in a particular embodiment of the invention.

In a step 601, the server equipment SRV 130 receives a message JOIN-RQ. The message JOIN-RQ was sent by the end device ED in question and was relayed by at least one said gathering gateway GW 120, 121, 122, 123. The message JOIN-RQ includes the unique identifier, DevEUI, of the end device ED in question. The message JOIN-RQ preferentially further includes a unique identifier, JoinEUI, of the server application that corresponds to the client application of said end device ED or of the server applications that correspond to the client applications of said end device ED.

In a step 602, the server equipment SRV 130 checks that the end device ED in question (e.g. authentication from security information given in the message JOIN-RQ) is enabled to join the communication system. Considering a positive check, the server equipment SRV 130 registers the end device ED in question in the communication system. The server equipment SRV 130 saves in memory the unique identifier, DevEUI, of the end device ED in question, and preferentially the unique identifier, JoinEUI, of the server application or applications concerned.

In a step 603, the server equipment SRV 130 obtains the address, DevAddr, to be used as a source address by the end device ED in question for subsequently transmitting uplink frames to the server equipment SRV 130, and which is subsequently used as a destination address by the server equipment SRV 130 for contacting the end device ED in question in unicast mode. The address in question has a range limited to the communication system, and is constructed as depicted schematically in FIG. 4B. In other words, some of the bits of this address attributed to said end device ED in question represent the group to which said end device ED belongs, as well as the subgroup to which said end device ED belongs, the remaining bits making it possible to distinguish said end device ED in question from any other end device ED in the same subgroup.

In a step 604, the server equipment SRV 130 obtains information representing the instant at which the next mass acknowledgement MACK is supposed to be transmitted for the group to which said end device ED belongs.

In a step 605, the server equipment SRV 130 transmits a message JOIN-ACCEPT that includes the field DA, DevAddr, notifying the address obtained at the step 603. The message JOIN-ACCEPT includes information representing the instant at which the next mass acknowledgement MACK is supposed to be transmitted for the group to which said end device ED belongs, as obtained at the step 604. Thus, by virtue of knowledge of the construction format of the address DevAddr (cf. FIG. 4B), said end device ED is able to determine to which group said end device ED belongs (field GID), as well as to which subgroup said end device ED belongs (field SGID), which for its part identifies the bit of index $k \in [0; 2^K-1]$ that relates to it in the field ACK of the future transmissions of mass acknowledgement messages MACK for said group.

The message JOIN-ACCEPT preferentially includes firstly (cf. field TINF in FIG. 4A) time reference information for synchronising the terminals ED to the network, and secondly (cf. field WUT in FIG. 4A) information representing the instant of transmission of the next mass acknowledgement message MACK. It should be noted that the end devices ED 110, 111, 112 can synchronise themselves timewise by another means (e.g. by relying on beacons transmitted by the gathering gateways GW 120, 121, 122, 123).

In a particular embodiment, the message JOIN-ACCEPT includes the values of the parameters K and M used for respectively defining the maximum number of subgroups per group and the maximum number of end devices ED per group in the communication system. The values of the parameters K and M may however be predefined and programmed on installation or in the factory.

In a particular embodiment, the mass acknowledgement messages MACK are encrypted and the message JOIN-ACCEPT includes the aforementioned security key AppKey_B (cf. field AK in FIG. 4A). This security key AppKey_B is thus used by the server equipment SRV 130 for encrypting the downlink frames broadcast for the group concerned (cf. field GID in FIG. 4B) and is therefore used by the end devices ED of the group in question for deciphering said downlink frames. In a variant, this security key AppKey_B is programmed in the factory in respective memories of the communication devices concerned, or derived from information programmed in the factory in the respective memories of the communication devices concerned.

Preferentially, the message JOIN-ACCEPT includes all the fields defined in FIG. 4A.

Figures 7, 8:
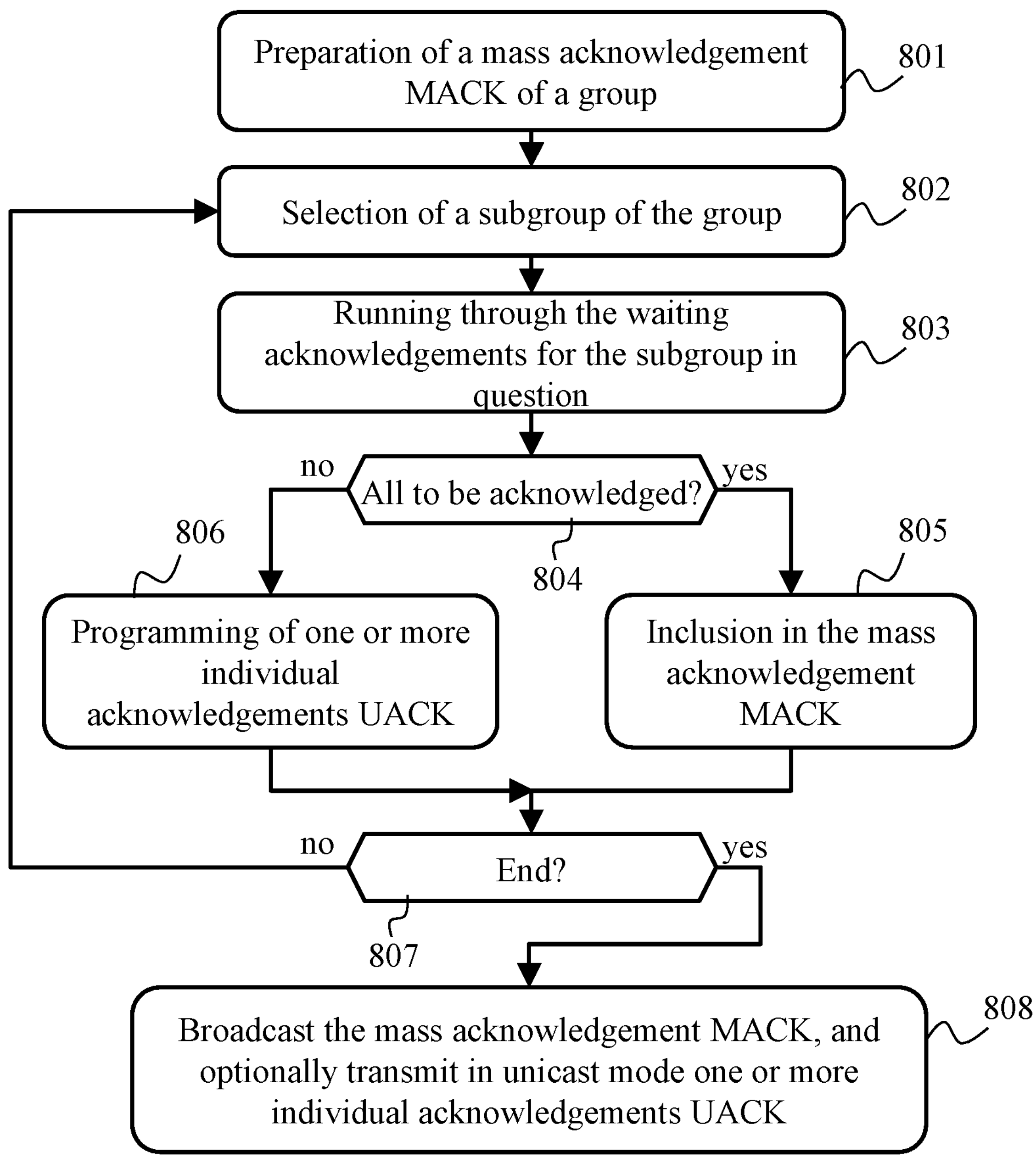
FIG. 7 illustrates schematically an algorithm for receiving uplink frames in the communication system of FIG. 1, in a particular embodiment of the invention.
FIG. 8 illustrates schematically an algorithm for acknowledging uplink frames received in the context of the algorithm in FIG. 7.

FIG. 7 illustrates schematically an algorithm for receiving uplink frames ULF in the communication system, in a particular embodiment of the invention.

In a step 701, the server equipment SRV 130 receives an uplink frame ULF coming from a said end device ED, which the server equipment SRV 130 is supposed to acknowledge.

In a step 702, the server equipment SRV 130 records in memory information indicating that it must subsequently acknowledge the uplink frame ULF received at the step 701. The server equipment SRV 130 records in memory at least the source address of the uplink frame ULF, namely the aforementioned address DevAddr. The server equipment SRV 130 then decides how to acknowledge said uplink frame ULF, at the end of the current period P between two mass acknowledgement messages MACK for the group identified by the source address of the uplink frame ULF.

FIG. 8 illustrates schematically, in a particular embodiment of the invention, an algorithm acknowledging uplink frames ULF received in the context of the execution of the algorithm in FIG. 7. The algorithm in FIG. 8 is applied independently for each group defined in the communication system.

In a step 801, the server equipment SRV 130 detects the end of the period P (optionally minus the aforementioned margin MG) since the last sending of a mass acknowledgement message by the group in question. The server equipment SRV 130 then prepares a new mass acknowledgement message MACK for said group.

In a step 802, the server equipment SRV 130 selects a subgroup in said group.

In a step 803, the server equipment SRV 130 runs through the waiting acknowledgements for the subgroup in question, in order to determine by which end devices ED the uplink frames ULF awaiting acknowledgement were transmitted.

In a step 804, the server equipment SRV 130 checks that it has received, during said period P, an uplink frame ULF to be acknowledged for each of the end devices ED that belong to the subgroup selected at the step 802. If such is the case, a step 805 is performed; otherwise a step 806 is performed.

In the step 805, the server equipment SRV 130 includes, in the mass acknowledgement message MACK being prepared, information indicating that all the uplink frames transmitted during the period P that has just elapsed by the end devices ED of the subgroup selected at step 802 are acknowledged. More precisely, the server equipment SRV 130 sets, to the aforementioned first predefined value, the bit in the field ACK (cf. FIG. 4D) corresponding to the index value $k \in [0; 2^K-1]$ representing the subgroup selected at step 802. Then the step 807 is performed.

In the step 806, the server equipment SRV 130 programmes the transmission of one or more individual acknowledgement messages UACK, i.e. to be transmitted in unicast mode. More precisely, the server equipment SRV 130 programmes the transmission of an individual acknowledgement message UACK for each end device ED of the subgroup selected at step 802 for which an acknowledgement is awaited. The server equipment SRV 130 sets, to the aforementioned second predefined value, the bit in the field ACK (cf. FIG. 4D) corresponding to the index value $k \in [0; 2^K-1]$ representing the subgroup selected at step 802. Then a step 807 is performed.

In the step 807, the server equipment SRV 130 checks whether all the subgroups in the group in question have been reviewed. If such is the case, a step 808 is performed;

otherwise the step 802 is repeated, by selecting another subgroup in said group that has not yet been reviewed.

In the step 808, the server equipment SRV 130 transmits the mass acknowledgement message MACK. As already indicated, the server equipment SRV 130 uses the broadcast address that corresponds to the group in question (cf. FIG. 4C). The server equipment SRV 130 can also encrypt the mass acknowledgement message MACK by means of the aforementioned security key AppKey_B. The server equipment SRV 130 selects a said gathering gateway GW 120, 121, 122, 123, and transmits thereto the mass acknowledgement message MACK, so that the gathering gateway GW 120, 121, 122, 123 selected broadcasts said mass acknowledgement message MACK to the end devices ED of the group in question. Optionally, the server equipment SRV 130 transmits one or more individual acknowledgements UACK, as programmed in the various potential iterations of the step 806.

The invention claimed is:

1. A method for acknowledging uplink frames transmitted from end devices to server equipment in a communication system, the method being implemented by the server equipment, the method comprising, for each said end device:

receiving from said end device a message requesting registration with the server equipment;

allocating said end device to a group and to a subgroup of said group;

obtaining an address to be used by said end device for subsequently communicating, in the communication system, part of said address identifying said group, another part of said address identifying said subgroup and yet another part of said address identifying said end device in said subgroup;

transmitting to said end device a registration-confirmation message, including the address obtained, as well as information representing an estimated instant of the next transmission of acknowledgement, referred to as mass acknowledgement, common to said group;

and for each group:

checking, for each subgroup in said group, whether an uplink frame has been received from each end device allocated to said subgroup;

constructing (1), for each subgroup of said group having a positive check, a mass acknowledgement for each positive check subgroup includes common positive acknowledgement information indicating that all of said uplink frames received from all the end devices in said subgroup are acknowledged, and (2) for each subgroup of said group that has a negative check, one or more individual acknowledgement messages for each of the end devices in said negative check subgroup where any uplink frame is not acknowledged, thereby providing indication of not acknowledging any uplink frame received from the end devices in said negative check subgroup, and wherein the mass acknowledgement further includes information representing an estimated instant of the next transmission of mass acknowledgement for said group; and broadcasting the mass acknowledgement, and acknowledging in unicast mode the uplink frames received that have not been acknowledged by the mass acknowledgement.

2. The method according to claim 1, wherein each subgroup is associated with a bit in a field of the mass acknowledgement, said bit is set to a first predefined value for acknowledging the uplink frames of all the end devices in the associated subgroup and said bit is set to a second predefined value for acknowledging none of the uplink frames of the end devices in the associated subgroup.

3. The method according to claim 1, wherein each registration-confirmation message further includes time reference information allowing timing synchronization of the end device receiving the registration-confirmation message, and each mass acknowledgement further includes also such time reference information.

4. The method according to claim 3, wherein the information representing an estimated instant of next transmission of mass acknowledgement for a said group is dependent of said time reference.

5. The method according to claim 1, wherein each mass acknowledgement of each group is broadcasted using a broadcasting address constructed on the basis of the addresses of the end devices in said group, replacing with a reserved value the part of said address identifying said subgroup and the another part of said address identifying said end device in said subgroup.

6. The method according to any one of claim 1, wherein each registration-confirmation message further includes a digital parameter value K defining, in the address of the end device to which the registration-confirmation message is addressed, the number of bits of the subgroups of the group to which said end device is allocated.

7. The method according to claim 6, wherein each registration-confirmation message further includes a digital parameter value M so that the difference M−K defines, in the address of the end device to which the registration-confirmation message is addressed, the number of bits of the identifiers of the end devices of the subgroup concerned.

8. The method according to claim 6, wherein each group identifier implicitly supplies a digital parameter value M so that the difference M−K defines, in the address of the end device to which the registration-confirmation message is addressed, the number of bits of the identifiers of the end devices in the subgroup concerned, the value of the parameter M then being obtained as follows:

consecutively running through the most significant bits in order to detect at which index the first bit in sequence to have the first predefined value for acknowledging the uplink frames of all the end devices in the associated subgroup or the second predefined value for acknowledging none of the uplink frames of the end devices in the associated starting from the most significant bit is situated; and using a predefined conversion table or formula known to said end device and to the server equipment between this index and the value of the parameter M.

9. A nontransitory storage medium storing a computer program comprising instructions causing execution of the method according to claim 1, when said instructions are executed by a processor.

10. A method for managing acknowledgement of uplink frames transmitted from end devices to server equipment in a communication system, the method being implemented by each end device, the method comprising the following steps:

transmitting to the server equipment a message requesting registration with the server equipment;

receiving from the server equipment a registration-confirmation message including an address to be used by said end device in order subsequently to communicate in the communication system, part of said address identifying a group to which said end device is allocated, another part of said address identifying a subgroup to which said end device is allocated in said group and yet another part of said address identifying said end device in said subgroup, the registration-confirmation message further including information representing an estimated instant of next transmission of acknowledgement, referred to as mass acknowledgement, common to said group;

transmitting an uplink frame to the server equipment;

receiving, by broadcast: (1) a mass acknowledgement for each subgroup where an uplink frame has been received from each end device allocated to said subgroup such that the mass acknowledgement includes first information indicating that all uplink frames for all the end devices in said subgroup are acknowledged, or (2) one or more individual acknowledgement messages for end devices in each subgroup where any uplink frame is not acknowledged, the mass acknowledgement further including information representing an estimated instant of next transmission of mass acknowledgement for said group; and receiving an acknowledgement in unicast mode when the uplink frame has not been acknowledged by the mass acknowledgement.

11. A nontransitory storage medium storing a computer program comprising instructions causing execution of the method according to claim 10, when said instructions are executed by a processor.

12. Server equipment configured to acknowledge uplink frames transmitted from end devices to the server equipment in a communication system, the server equipment comprising electronic circuitry configured for, for each said end device receiving from said end device a message requesting registration with the server equipment:

allocating said end device to a group, and to a subgroup of said group;

obtaining an address to be used by said end device for subsequently communicating in the communication system, part of said address identifying said group, another part of said address identifying said subgroup and yet another part of said address identifying said end device in said subgroup;

transmitting to said end device a registration confirmation message, including the address obtained, as well as information representing an estimated instant of next transmission of acknowledgement, referred to as mass acknowledgement, common to said group; and for each group:

checking, for each subgroup in said group, whether an uplink frame has been received from each end device allocated to said subgroup;

constructing (1) for each subgroup of said group having a positive check, a mass acknowledgement that includes common positive acknowledgement information indicating that all of said uplink frames received from all the end devices in said subgroup are acknowledged, and (2) for each subgroup of said group that has a negative check, one or more individual acknowledgement messages for each of the end devices in said negative check subgroup where any uplink frame is not acknowledged, thereby providing indication of not acknowledging any uplink frame received from the end devices in said negative check subgroup, the mass acknowledgement further including information representing an estimated instant of next transmission of mass acknowledgement for said group; and broadcasting the mass acknowledgement, and acknowledging in unicast mode the uplink frames received that have not been acknowledged by the mass acknowledgement.

13. An end device configured to manage acknowledgement of uplink frames transmitted to server equipment in a communication system comprising other end devices, said end device comprising electronic circuitry configured for:

transmitting to the server equipment a request for registration with the server equipment;

receiving from the server equipment a registration confirmation message including an address to be used by said end device for subsequently communicating in the communication system, part of said address identifying a group to which said end device is allocated, another part of said address identifying a subgroup to which said end device is allocated in said group and yet another part of said address identifying said end device in said subgroup, the registration-confirmation message further including information representing an estimated instant of next transmission of acknowledgement, referred to as mass acknowledgement, common to said group;

transmitting an uplink frame to the server equipment;

receiving, by broadcast, a mass acknowledgement for each subgroup in said group: (1) an uplink frame has been received from each end device allocated to said subgroup such that the mass acknowledgement includes common information indicating that all uplink frames for all the end devices in said subgroup are acknowledged, or (2) with one or more individual acknowledgement messages for end devices in said subgroup where any uplink frame is not acknowledged, the mass acknowledgement further including information representing an estimated instant of next transmission of mass acknowledgement for said group; and receiving an acknowledgement in unicast mode when the uplink frame has not been acknowledged by the mass acknowledgement.

* * * * *